2,951,631

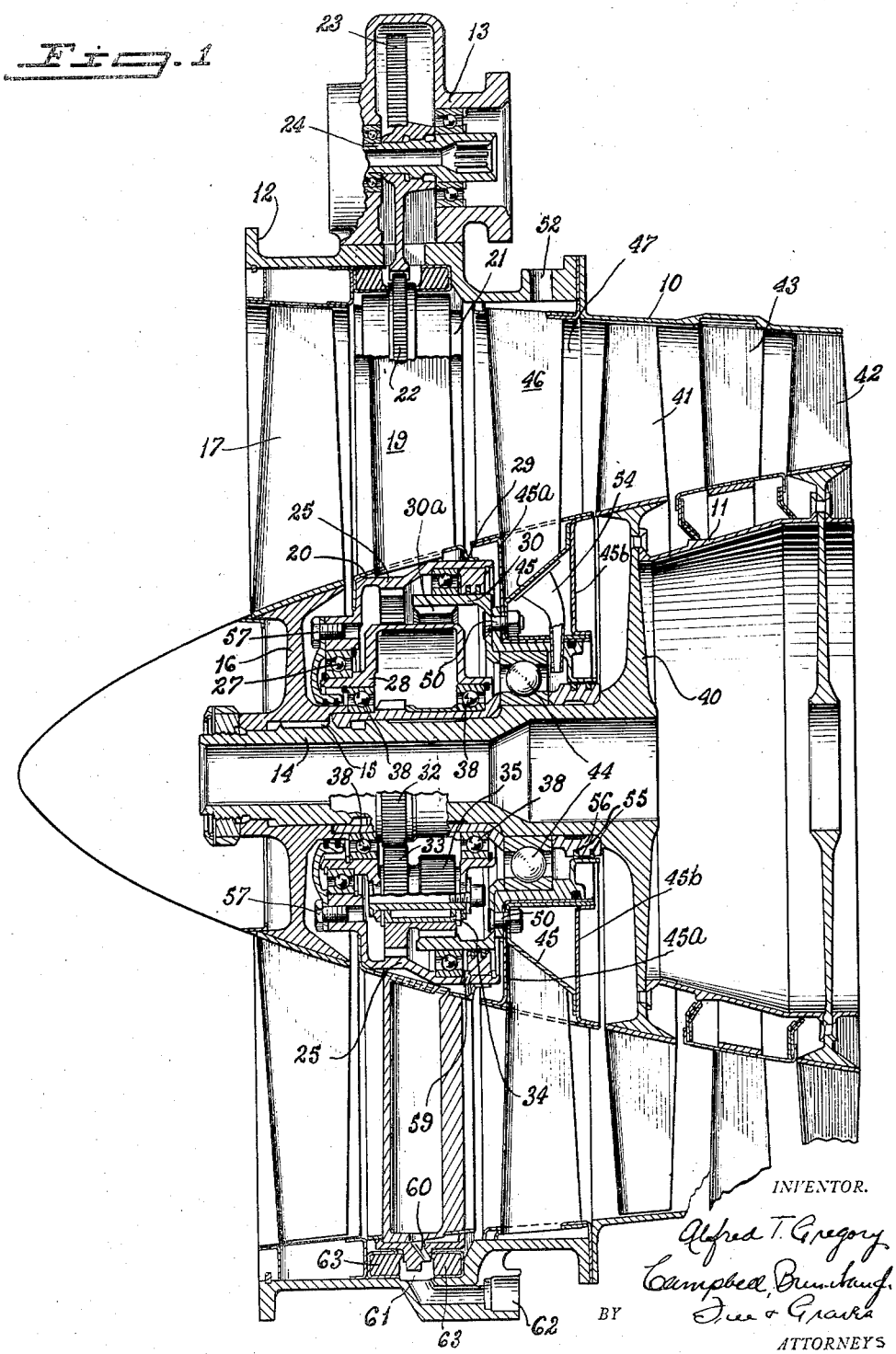

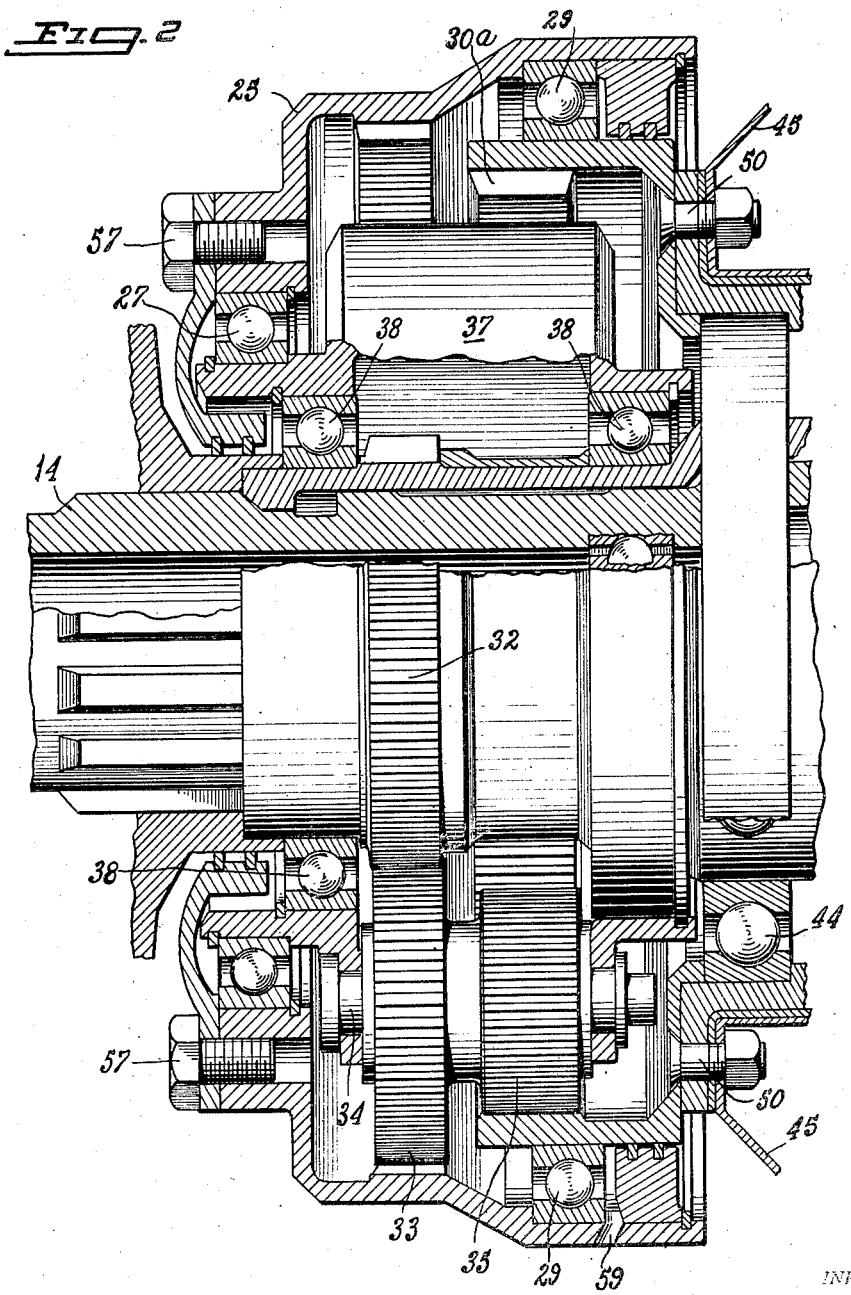

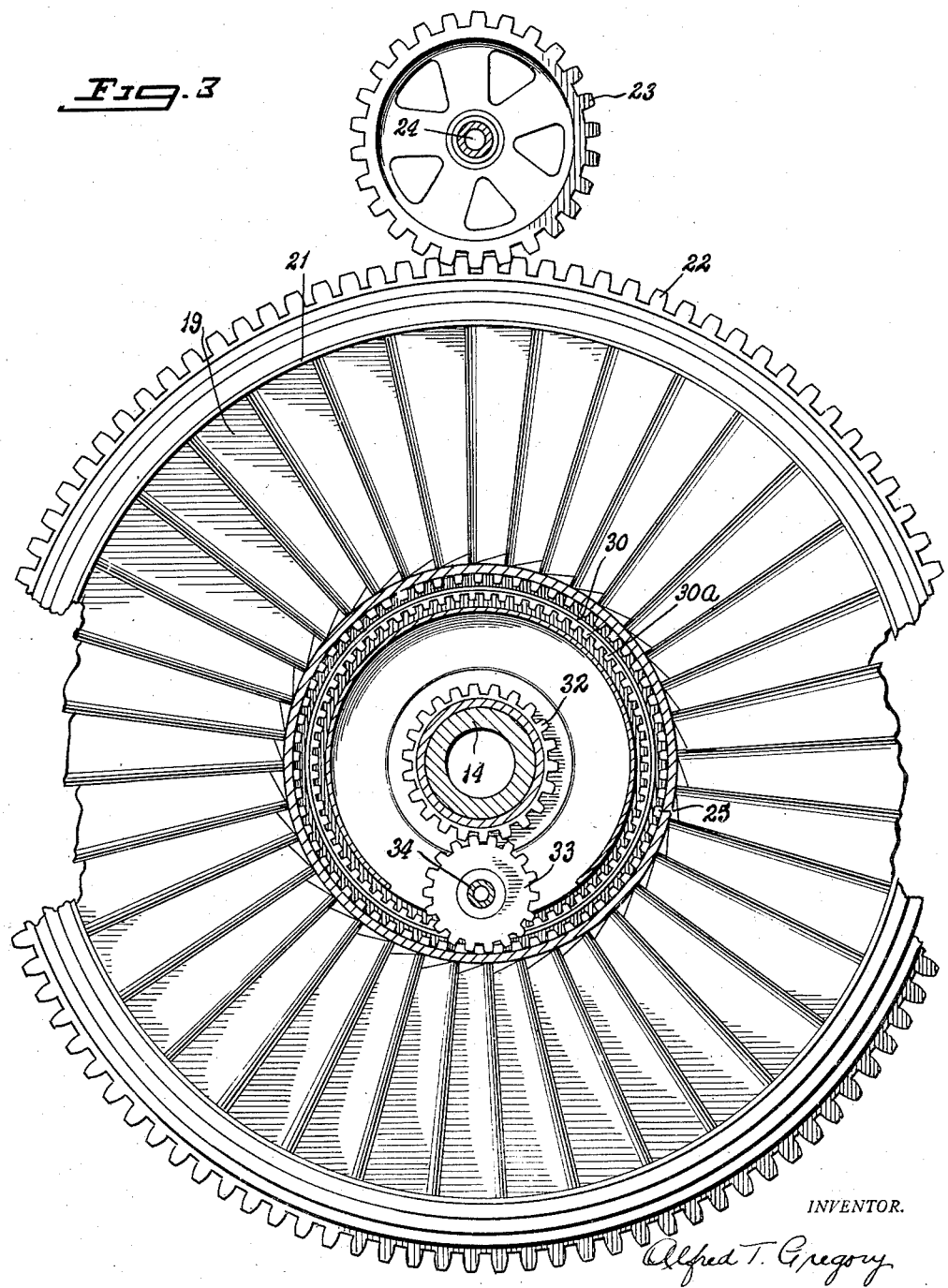

ENGINE ACCESSORY DRIVE

Alfred T. Gregory, Manhasset, N.Y., assignor to Fairchild Engine and Airplane Corporation, Hagerstown, Md., a corporation of Maryland Filed Jan. 25, 1956, Ser. No. 561,197

9 Claims. (Cl. 230—122)

This invention relates to drive transmissions for driving accessories of an engine from the main drive shaft thereof, and more particularly to a planetary gear system for driving the accessories of such engines.

In power generating engines wherein driven accessories are mounted on the engine housing or in proximity thereto, these accessories are frequently driven from the main rotor shaft via a drive transmission which includes a shaft driven from the main drive shaft by bevel gears and having an axis which extends radially to the axis of the main drive shaft. In gas turbine engines, this radially disposed shaft passes through a protective fairing of undesirably large cross section which extends across the air or gas stream, usually upstream of the compressor. This protective fairing interposed in the air or gas stream obstructs the flow of intake air or gas and is detrimental to the aerodynamic characteristics of the engine. Also, it requires an engine and main drive shaft of greater length, and consequently of greater weight, than would be necessary if the radial shaft could be eliminated.

In the present invention the conventional radially-extending shaft and gearing have been replaced by a rotating assembly which rotates at relatively slow speed as compared with the rotor shaft of the turbine. This rotatable assembly includes a plurality of vanes, which perform little or no work on the air stream, a drive gear for the accessories and a driven gear through which rotation is imparted to the assembly. The driven gear of the assembly, in turn, is driven from the rotor shaft via a speed reduction planetary gear system which is entirely enclosed within the engine housing.

The present invention will be more fully understood by reference to the detailed description which follows and to the accompanying drawings in which:

Fig. 1 is a cross-sectional view of a compressor equipped with the present invention;

Fig. 2 is an enlarged view of certain of the parts shown in Fig. 1; and

Fig. 3 is an end view of the gear transmission system.

Referring to the drawings, a main compressor casing 10 encloses and supports therein the main operating elements of a gas turbine, including the rotor 11 at the forward end of the engine, a plurality of stages of rotor blades, such as those represented 41, 42, and a plurality of stages of stator blades 43 interposed between the rotor blades. An annular casing 12 is mounted on the front end of the casing 10, and the casing 12 supports an accessory drive housing 13 thereon. A disc 40 is mounted on the front end of the rotor 11, and a shaft 14 is formed integrally with the disc and extends forwardly of the rotor 11 within the casing 12.

At the extreme forward end, the shaft 14 supports thereon by means of a splined connection 15 a disc 16 which carries a plurality of first stage compressor blades 17. A rotating assembly is disposed immediately adjacent but downstream of the disc 16 and the compressor blades 17 thereon. This rotating assembly includes a plurality of vanes 19 which extend substantially radially between inner and outer annular shrouds 20, 21, respectively. An accessory drive gear 22 is welded or brazed to the outer periphery of the outer shroud 21, and the gear 22 meshes with a rotatable gear 23 mounted on a shaft 24 within the accessory drive housing 13. The shaft 24 may be coupled to a drive transmission to drive the various accessories of an engine.

A gear 25 having teeth formed around its inner periphery is welded or brazed to the inner surface of the shroud 20, and the gear 25 is rotatably supported by bearings 27 to the outer periphery of a cage 28 and by bearings 29 to the outer periphery of a stationary sun gear 30 also having teeth 30a formed on the inner periphery thereof. The stationary sun gear 30 is attached by means of bolts 50 to the front flange 45a of a hub 45, later to be described.

The drive gear 32 for the drive transmission of the present invention is fitted and splined onto the drive shaft 14, and the gear 32 meshes with a pinion 33, which pinion 33 also meshes with the sun gear 25 supported by the inner shroud 20. The pinion 33 is supported on the same shaft 34 with a pinion 35, and the pinions 33 and 35 are connected so that they rotate at the same angular velocity. The pinion 35, in turn, meshes with the teeth 30a of the stationary sun gear 30.

The pinions 33 and 35 are supported within the pinion cage 28 which is supported for rotation by ball bearings 38 on the hub portions of the drive gear 32, and the shaft 34 which supports the pinions 33 and 35 is supported at both ends in the cage 28. Thus, as the axis of the shaft 34 travels in a circular path about the axis of the shaft 14, the cage 28 rotates on its bearings 38 about the axis of the shaft 14.

As mentioned above, the disc 40 is formed integrally with the rotor shaft 14 at the extreme right end thereof as viewed in Fig. 1, and the disc 40 carries second stage rotor blades 41 about its periphery. The shaft 14 and the disc 40 support the forward end of the compressor rotor 11 which carries a succeeding row or stage of rotor blades 42, stator vanes 43 being interposed between the blades 41 and 42 of the turbine. Succeeding stages of rotor blades and stator vanes may also be provided. However, these are conventional and are not shown in the drawings.

The main drive shaft 14 is rotatably mounted in bearings 44 within a stationary hub 45, which hub includes front and rear flanges 45a and 45b, respectively, attached thereto. The hub 45, in turn, is supported by the inner ends of a plurality of stator vanes 46, the outer ends of the stator vanes being affixed to an outer stator shroud 47. The stator shroud 47 is mounted to the inner surfaces of the main compressor casing 10 and the front compressor casing 12.

Lubrication of the planetary reduction gear system and bearings is accomplished from the main engine lubrication system and also through a port 52 in the front compressor casing 12, which communicates with a passage through one of the upwardly disposed stator vanes 46. The lower end of the passage within the stator vane 46 communicates with a tube 54. Leakage of oil is prevented by seal rings 55 in the seal ring carrier 56. Oil drainage from the planetary reduction gear system is provided for by means of the oil drain holes 59, the hollow stator vanes 19 and the outer drain holes 60 in the gear 22 which communicate with a hollow chamber 61. The chamber 61, in turn, communicates with an outlet connection 62 in casing 12. Loss of oil from the annular chamber 61 is prevented by seals 63 which bear against the sides of the accessory drive gear 22.

Summarizing the drive transmission of the present invention, the accessories to be driven are mounted outside the casings 10, 12 and are driven by a shaft 24 within the housing 13. The shaft 24 carries a gear 23 thereon, and the gear 23 and the shaft 24 are driven by the gear 22 carried around the outer circumference of the rotating assembly. The rotating assembly includes the inner and outer shrouds 20, 21, the vanes 19 extending between the shrouds, the drive gear 22 and driven sun gear 25 mounted within the inner shroud 20. The gear 25 of the assembly is driven by the planetary gear system, which includes pinions 33, 35 and the stationary sun gear 30, from the drive gear 32 mounted on the rotor shaft 14. The drive gear 32 meshes with the pinion 33, and the pinion 33 also meshes with the rotatable sun gear 25. The pinion 33 is mounted on the same shaft 34 and connected to the pinion 35, and the pinion 35 meshes with the teeth 30a formed on the inner periphery of the stationary sun gear 30. Thus, the rapidly rotating gear 32 and the stationary gear 30 cause the housing 28 within which the pinions 33, 35 are accommodated to travel in an orbit about the axis of the shaft 14. The pinion 33, in turn, rotates about its own axis, driving the sun gear 25, thus serving as a reduction gear system. This gear system, above described, in its preferred form provides a reduction in speed from the drive shaft 14 to the rotating gear 25 of about 16 to 1.

It is evident from the foregoing description that the planetary gear system above described provides a convenient drive transmission for the engine accessories while nevertheless maintaining the passage for air or gas to the turbine free of any obstructions to the passage of the air or gas stream, other than the vanes 19. Because, however, the first stage compressor blades 17 are situated upstream of the vanes 19, and because also of the reduced speed of rotation of the vanes 19, these vanes serve largely as stator vanes.

The invention has been shown in a single preferred form and by way of example only, and obviously many modifications and variations may be made therein without departing from the spirit of the invention. The invention, therefore, is not to be limited to any specified form or embodiment, except in so far as such limitations are set forth in the appended claims.

I claim:

1. In a turbine engine, a rotor shaft, a gear carried by said rotor shaft, a bank of rotating vanes, a drive gear on the outer circumference of said bank of vanes, a gear on the inner circumference of said bank of vanes, a rotatable planetary gear driven by said gear carried by said rotor shaft and also engaging said gear on the inner circumference of said bank of vanes, a rotatable pinion connected coaxially with said planetary gear, a fixed sun gear engaging said pinion, whereby the axis of said planetary gear is caused to move in an orbit about the axis of said rotor shaft, the rotation of said planetary gear about its own axis driving said gear formed on the inner circumference of said bank of vanes at a reduced angular velocity, and means driven by the drive gear on the outer circumference of said bank of vanes.

2. A turbine engine as set forth in claim 1 including a housing for said planetary gear and the pinion and means for mounting said housing for rotation about the axis of the rotor shaft.

3. A turbine engine as set forth in claim 1 including an outer casing, a bank of stator vanes mounted within said casing and a passage for the lubrication of said rotor shaft formed through at least one of the stator vanes.

4. In an axial flow turbine, a housing through which an impelling fluid flows, a main shaft, a driven shaft a turbine rotor coupled to said main shaft, a planetary gear train driven from the main shaft, and a second rotor upstream of said turbine rotor, said second rotor being driven from the main shaft through the planetary gear train, said second rotor comprising inner and outer concentric rings of gear teeth defining an annular passage therebetween and a plurality of fluid deflecting vanes extending between said inner and outer concentric rings of gear teeth in order to deflect the path of flow of the impelling fluid against the turbine rotor, the outer ring of gear teeth of said second rotor transmitting the drive to the driven shaft.

5. A drive transmission system adapted to be interposed in the path of flow of a fluid, comprising drive and driven shafts and a planetary gear train transmitting the drive from the drive shaft to the driven shaft, said planetary gear train including a rotor having inner and outer concentric rings of gear teeth which define an annular passage therebetween for the flow of said fluid, and a plurality of struts extending across said annular passage between the inner and outer rings of gear teeth.

6. A drive transmission system as set forth in claim 5, wherein said struts are in the form of fluid deflecting vanes.

7. A turbo engine comprising a housing, a rotor therein which cooperates with the housing to define an annular fluid passage through the housing, a driven shaft and a planetary gear system which transmits the drive from the rotor to the driven shaft, said planetary gear system including a rotor having inner and outer concentric rings of gear teeth which define an annular passage therebetween for the flow of said fluid, the annular passage formed by the concentric rings of gear teeth being in line with the annular passage through the housing, and a plurality of struts extending across said annular passage between the inner and outer rings of gear teeth, said outer ring transmitting the drive to the driven shaft.

8. In a drive transmitting apparatus adapted to be interposed in the path of flow of a fluid, a main drive shaft, an auxiliary drive shaft, and a drive transmission system between said main drive shaft and said auxiliary drive shaft comprising a rotatable assembly including a gear around the outer periphery of said assembly for transmitting rotation to the auxiliary drive shaft and a gear carried by the inner periphery of said assembly, said gears defining an annular passage therebetween for the flow of a fluid, struts connecting said gears, means for supporting said rotatable assembly coaxially on the main drive shaft, a rotatable planetary gear driven by the main driveshaft and also engaging the gear carried by the inner periphery of said assembly, a rotatable pinion connected coaxially with said planetary gear, and a sun gear engaging said pinion whereby as said planetary gear travels in an orbital path, rotation about its own axis is imparted to it from the sun gear through the pinion, the rotation of the planetary gear about its own axis driving the rotatable assembly at a reduced speed of rotation.

9. A drive transmission apparatus as set forth in claim 8, including a plurality of blades carried in the annular passage of said relatively slow rotating assembly and a plurality of blades carried by said fast rotating main drive shaft downstream of said blades carried by the rotating assembly.

References Cited in the file of this patent

UNITED STATES PATENTS

| 2,402,756 | Lawler | June 25, 1946 |
| 2,444,734 | Gillett | July 6, 1948 |
| 2,583,872 | Newcomb | Jan. 29, 1952 |
| 2,689,681 | Sabatiuk | Sept. 21, 1954 |
| 2,702,985 | Howell | Mar. 1, 1955 |